(12) United States Patent
Lacaze et al.

(10) Patent No.: US 9,080,886 B1
(45) Date of Patent: Jul. 14, 2015

(54) SYSTEM AND METHOD FOR URBAN MAPPING AND POSITIONING

(71) Applicants: Alberto Daniel Lacaze, Potomac, MD (US); Karl Murphy, Rockville, MD (US); Kyle Smith, Montgomery Village, MD (US)

(72) Inventors: Alberto Daniel Lacaze, Potomac, MD (US); Karl Murphy, Rockville, MD (US); Kyle Smith, Montgomery Village, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 0 days.

(21) Appl. No.: 13/958,537

(22) Filed: Aug. 3, 2013

Related U.S. Application Data

(60) Provisional application No. 61/679,355, filed on Aug. 3, 2012.

(51) Int. Cl.
*G01C 21/00* (2006.01)
*G01C 21/28* (2006.01)
*G06T 7/20* (2006.01)

(52) U.S. Cl.
CPC .............. *G01C 21/28* (2013.01); *G06T 7/2086* (2013.01); *G06T 2200/08* (2013.01); *G06T 2207/10021* (2013.01)

(58) Field of Classification Search
USPC ......................................................... 701/451
See application file for complete search history.

(56) References Cited

U.S. PATENT DOCUMENTS

| | | | |
|---|---|---|---|
| 6,009,359 A * | 12/1999 | El-Hakim et al. | 701/28 |
| 6,781,618 B2 * | 8/2004 | Beardsley | 348/43 |
| 8,031,933 B2 * | 10/2011 | Se et al. | 382/154 |
| 2004/0109012 A1 * | 6/2004 | Kraus et al. | 345/700 |
| 2009/0120653 A1 * | 5/2009 | Thomas | 169/61 |
| 2011/0115909 A1 * | 5/2011 | Sternberg et al. | 348/143 |
| 2011/0199376 A1 * | 8/2011 | Salemann | 345/424 |
| 2012/0099402 A1 * | 4/2012 | Debrunner et al. | 367/134 |

* cited by examiner

*Primary Examiner* — Thomas Tarcza
(74) *Attorney, Agent, or Firm* — White-Welker & Welker, LLC; Matthew T. Welker, Esq.

(57) ABSTRACT

UMAPS is a multifaceted system that can be robot-mounted, human-worn, or canine carried. UMAPS produces real-time, 3D mapping and localization for the user as they move throughout a GPS-denied environment (e.g. buildings, caves, or tunnels). An Operator Control Unit (OCU) displays information collected by UMAPS; 2D floorplans; 3D textured-enriched surfaces of the structure's interior; and the location of the users within that structure. UMAPS has an open architecture that allows it to function with any OCU. UMAPS has three distinct subsystems: obstacle maps for robot mobility, mapping, and positioning.

9 Claims, 19 Drawing Sheets

Before map feature alignment
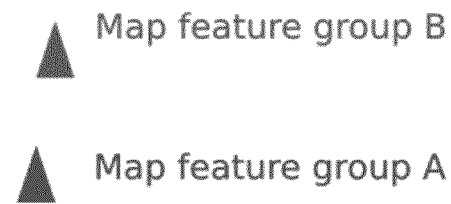
After map feature alignment
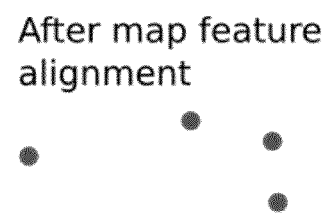
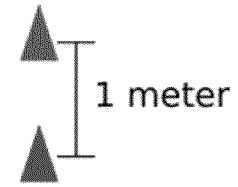
Fig. 11a
Fig. 11b

SYSTEM AND METHOD FOR URBAN MAPPING AND POSITIONING

CROSS REFERENCE TO RELATED APPLICATIONS

This application claims priority from U.S. Patent Application Ser. No. 61/679,355, entitled "System and Method for Urban Mapping and Positioning", filed on 3 Aug. 2012. The benefit under 35 USC §119(e) of the United States provisional application is hereby claimed, and the aforementioned application is hereby incorporated herein by reference.

SEQUENCE LISTING OR PROGRAM

Not Applicable

TECHNICAL FIELD OF THE INVENTION

The present invention relates generally to mapping and geo-location. More specifically, the present invention relates to an accurate, distributed navigation system for determining the location of equipment or individuals as they carry out a mission, even in GPS-denied areas.

BACKGROUND OF THE INVENTION

The acceptance of robotics among the military is growing. A prime example is Unmanned Aerial Vehicles (UAVs). UAVs have provided a necessary capability of reconnaissance and attack mission in high-risk scenarios, where a human pilot could lose his life. UAVs are used not only by the US Air Force, but also by the US Marine Corps and US Army. The UAV is a tremendous success story for how robotics can positively change the dynamics of the battlefield and allow for the standoff of humans from dangerous areas of operations.

The field of Unmanned Ground Vehicles (UGVs), both small and large, is expected to adopt some degree of autonomy to fulfill military missions. If the technology advances, UGVs could see widespread adoption similar to UAVs. To an extent, this process is already in its early stages. For example, USSOCOM's SANDI program is tasked with building and deploying approximately six unmanned, autonomous ground robotic High Mobility Multipurpose Wheeled Vehicles (HMMWVs) to operational areas in Afghanistan. These HMMWVs are designed to drive common paths and detect unexploded IEDs. There has also been significant use of small UGVs in IED defeat missions. Many times, these UGVs are equipped with manipulators that interrogate and disable a suspected IED. However, these small UGVs rarely have any autonomous capabilities.

How would the battlefield change if there were autonomous robotic systems that could explore structure interiors and share the information with humans? A clear consequence would be greater intelligence prior to entering and clearing a building. It would also be possible to quickly and accurately survey a structure's interior. Consider a survey operation at a tunnel or bunker network in a hostile region. Surveys help facilitate successful air strikes (e.g., targeted ground depth, knowledge of air shafts, and ordinance selection). Depending on the size of the structure, a survey could take several days. What if the same structure could be autonomously explored by several ground robotic platforms and achieve similar accuracy in a matter of hours? Advantages to this capability include the timely removal of personnel from danger, more precise targeting information and increased mission speed.

SUMMARY OF THE INVENTION

UMAPS is a multifaceted system that can be robot-mounted, human-worn, or canine carried. UMAPS produces real-time, 3D mapping and localization for the user as they move throughout a GPS-denied environment (e.g. buildings, caves, or tunnels). An Operator Control Unit (OCU) displays information collected by UMAPS; 2D floorplans; 3D textured-enriched surfaces of the structure's interior; and the location of the users within that structure. UMAPS has an open architecture that allows it to function with any OCU. UMAPS has three distinct subsystems: obstacle maps for robot mobility, mapping, and positioning as shown in FIG. 1.

These subsystems can be combined to provide products that address specific military needs. For example, one capability that can be produced is UMAPS-Positioning (UMAPS-P), which provides GPS-denied position estimation for human users. The applications of such technology include localization within a building and exploration of tunnels with a quick determination of the position of each squad member. Another capability is for a human-worn mapping component of UMAPS that can provide increased situational awareness for command and control, identify unexplored regions of a building, and provide advanced intelligence for warfighters. A third capability allows mapping to be generated from a robotic platform, providing critical 3-D survey information of remote, enclosed or dangerous spaces without compromising human presence or safety. A fourth capability allows the determination of canine unit positioning relative to its mission objective.

As a result of testing, the UMAPS positioning subsystem improvements over the initial concept included integrating GPS with the inertial navigation system for better global accuracy.

In other embodiments the mapping prototype was adapted for mounting on a backpack and a robotic platform.

The information from multiple localization methods will be fused by creating a "spring" network among different updates, using the springs to "pull" the navigation solutions to a more accurate location. The strength of each spring will be determined by the confidence of the update. This type of architecture was originally developed by RR and used on the UMAPS program to fuse the relative localization solution of multiple INS systems strapped to dismounted soldiers. As the soldiers explored the GPS-denied area, their INS navigation solution was sent to an OCU. If the soldiers met at a "rendezvous" location, this was sent to the OCU which then created an infinitely tight spring between their navigation solutions at that time, essentially locking them into the same place. Looser springs existed along each of their relative solutions in order to keep the general shape of the path that they took. Springs also existed to absolute positions, which were either surveyed points that the soldiers tagged (infinitely tight springs) or GPS updates when available (somewhat looser springs).

In an alternative embodiment, this same framework will be used by the proposed system, but instead of tagging "rendezvous" points to fuse multiple relative solutions, the system will use absolute position "springs" to pull the overall solution toward the updates.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 10a illustrates the distance between pixels at 1 meter to the target object. FIG. 10b illustrates the distance between pixels at 20 meters to the target object.

FIGS. 11a and 11b show an example map feature alignment. In this case, when feature group B is detected, the true position of the robot is 1 meter north of the robot when feature group A was detected. The triangle is a robot and circles are map features.

DETAILED DESCRIPTION OF THE INVENTION

Figure 1:
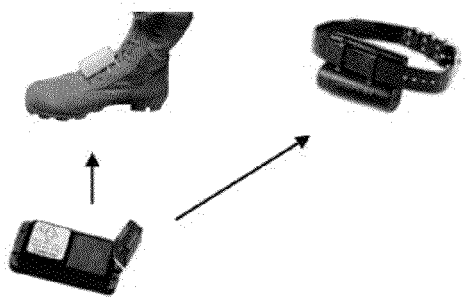
FIG. 1 illustrates that the UMAPS technology provides unparalleled situational awareness for the warfighter, including positioning and mapping in GPS denied environments. Three variants allow mounting on robots, humans, and K-9s.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

In robotics, there are two broad classes of sensors, called proprioceptive and exteroceptive. Proprioceptive sensors measure physical phenomena internal to the robot, e.g., inertial units and wheel encoders. Exteroceptive sensors measure the robot's external environment, e.g., cameras, LADAR, and sonar. Traditionally, proprioceptive and exteroceptive sensors do not work in tandem; proprioceptive compute position and exteroceptive build the map. However, it is possible to combine these sensors in a way to simultaneously improve the results from each type. A common example of this combination is a GPS/INS sensor. INS, an inertial navigation sensor, is capable of computing the position and orientation of a rigid body by integrating accelerations to form position and rotational velocities to form orientation. However, no external beacons are available for a purely inertial sensor, so the sensor's position and orientation estimates drift, or degrade, as time passes. If an exteroceptive sensor like GPS is added into the solution, then absolute position corrections can be added into the position solution, which also helps correct the orientation solution. By adding in regular, absolute position fixes with GPS, a relatively cheap inertial sensor can achieve the same level of accuracy as a relatively expensive inertial sensor. The tradeoff results in an overall cheaper sensor (the cost of a GPS/INS is primarily driven by the cost of the inertial sensors) for a higher development cost (determine how to properly combine the GPS and inertial sensors).

About 20 years ago, it became clear that positional and orientation corrections can be applied with a large variety of exteroceptive sensors, not just GPS. This research into how to create and apply corrections drives the Simultaneous Localization And Mapping (SLAM) problem. The goal is to create a system with a value greater than the sum of its parts. Of course, this system requires a higher development cost, but has much cheaper parts, which directly translates to a more cost-effective system.

Traditional, single-agent SLAM attempts to solve the navigation problem by using map features to correct position and orientation. The result is both an accurate map and accurate positioning. In SLAM, a robot is exploring an environment and building a map. Sometimes, the robot will detect a "map feature." On a second visit to the same area, the robot should be capable of (1) detecting the same map feature, (2) determining that it has already seen that map feature, and (3) correcting the robot's path and map given the feature match. Each step is a non-trivial problem and inspires heated debates among researchers.

Figure 2:
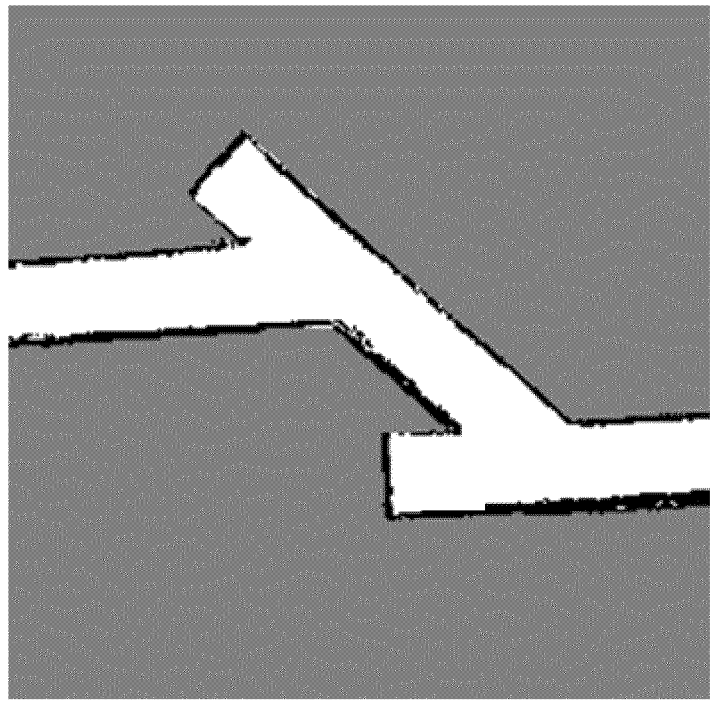
FIG. 2 is a 2D, overhead map generated by a line-scanning LADAR. Black pixels are LADAR hits, while white areas are regions without LADAR hits.
Figure 3:
FIG. 3 is a point cloud generated by a 3D LADAR.

Map feature detection is highly dependent upon the chosen exteroceptive sensors. There is a large amount of literature devoted to LADAR, cameras (stereo or monocular), sonar, and even magnetometers. Sensor selection is problem dependent. The most common exteroceptive sensors for ground robotics are LADAR and stereo vision. Both of these sensor classes are range/bearing sensors. Many LADAR sensors are a single line scanner as shown in FIG. 2, which means they take a 2D slice of the environment rather than a full 3D measurement. In the last 5 years, fully 3D LADAR sensors, as show in FIG. 2, have grown in popularity. These sensors tend to be significantly more expensive than line scanners, but provide a more robust (in both accuracy and fidelity) representation of the environment.

Figure 4A:
FIG. 4(a) is an image of the area captured by a stereo camera pair.
Figure 4B:
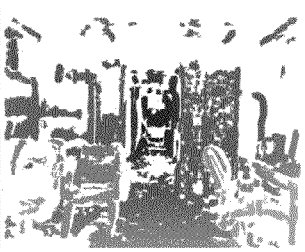
FIG. 4(b) is a depth map of the image. Cyan is closer and darker blue is farther.
Figure 4C:
FIG. 4(c) is the 3D point cloud with assigned colors from the original image.
Figure 5A:
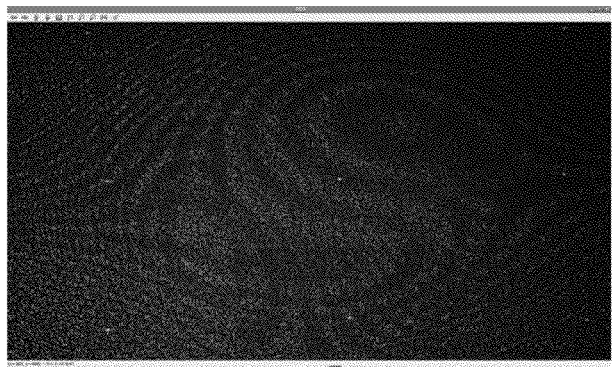
FIG. 5(a) is an IR light pattern as seen by the structured light sensor.
Figure 5B:
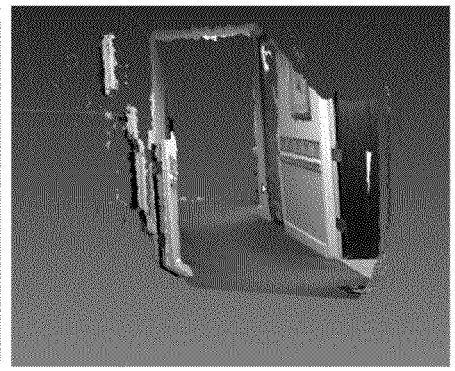
FIG. 5(b) is 3D data from the Microsoft Kinect colored with image data.
Figure 6:
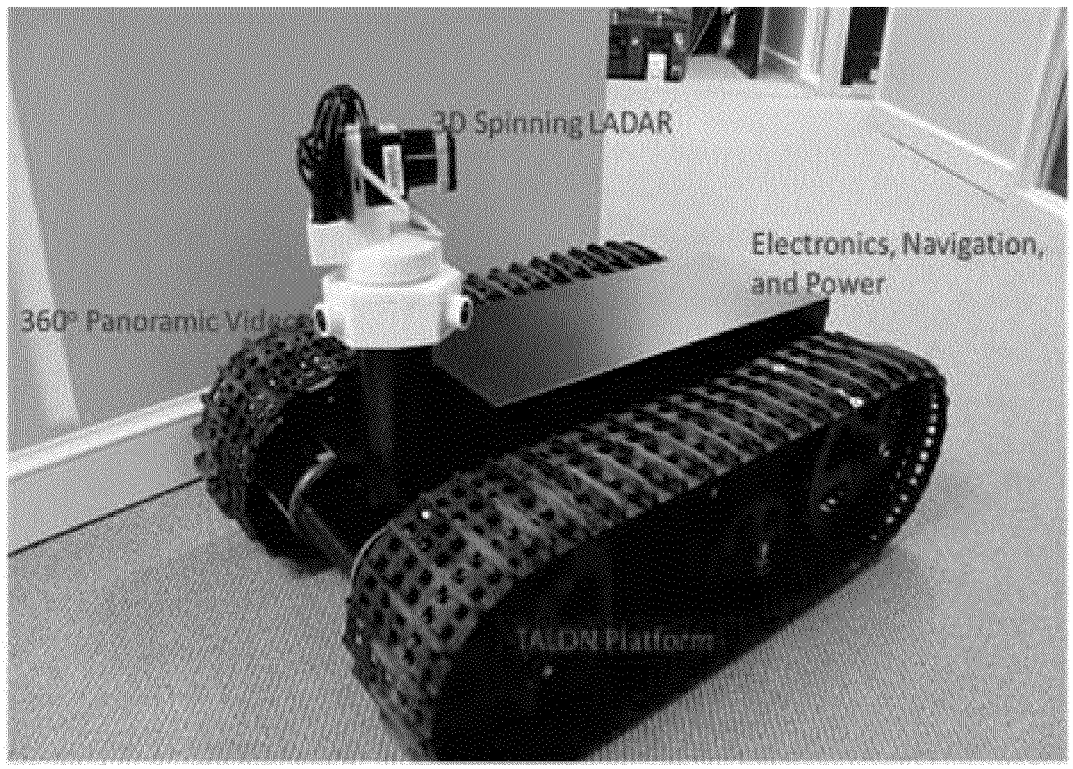
FIG. 6 is a platform with autonomy package.

LADAR is an active sensor, emitting lasers on the infrared frequencies. Stereo vision, as shown in FIG. 4, is a passive sensor (i.e., no emissions) that relies on pixel correspondences to triangulate a feature's position. Vision sensors are relatively cheap compared to LADAR and provide 3D data. However, LADAR typically provides a more dense and accurate measurement than stereo vision, especially at great distances. Moreover, vision-based sensors, in general, are very dependent on lighting conditions. LADAR can accurately sense in lightless environments, while vision sensors require some form of lighting to be effective.

Finally, even under ideal conditions, stereo requires the accurate matching of image pixels. In cluttered environments, these matches tend to be better. However, if the cameras were pointed at a plain, white wall, almost no features can be detected or matched.

A relatively new sensor type that is gaining popularity is a structured light sensor like the MICROSOFT KINECT as shown in Error! Reference source not found. The KINECT works with the same principles of stereo vision, triangulating to known pixel matches. However, the KINECT emits light in the infrared range. This light is in a distinct and repeatable pattern that allows the KINECT to "create" its own stereo features. Structured light sensors are "best of both worlds" sensors in that they provide dense, 3D point clouds at an inexpensive price. The drawback is that they tend to perform poorly in any environment where there is a large amount of infrared light present (e.g., outside while the sun is shining) and have a range of only a couple meters, which is not suitable for many applications. Structured light sensors are relatively new, so there may be new sensors that are not yet released that could overcome these drawbacks.

What is a map feature? It depends on the sensor. For a LADAR line scanner, a feature could be the intersection of two walls, or a corner. In the context of 3D LADAR, it could be corners at the intersection of walls and the ceiling or floor. For stereo vision, features can be a number of different machine vision features, such as Harris corners, SIFT, or SURF. Finally, structured light is similar to 3D LADAR, so corners are appropriate. It is possible that there are features uniquely well-suited for structured light sensors, but these sensors are new, so little research has been performed in this area. The drawback with some of these features is that they are too numerous, making them difficult to maintain and share with users or other robots. These features are intended as examples only and are not an exhaustive list.

How can a robot know if it has already sensed a map feature? The solution is a correspondence problem. A vision feature like SIFT or SURF encodes information about the surrounding image into the feature itself. These features are constructed with the intent to be easy to match. Corners are much more difficult. These features must be matched based on the presence or absence of nearby corners. The corner correspondence problem is susceptible false positives/negatives. For this reason, corners are rarely used in practice, but they provide an intuitive example, which is why they are mentioned in this section.

Finally, how does the SLAM algorithm update the past robot trajectory and present position and orientation? There are several approaches that are quite common in literature. The first is a Particle Filter (PF). The PF maintains a set of hypotheses for how the "true" map and robot path looks. In a non-trivial case, most, if not all, hypotheses should differ. If a hypothesis becomes "bad" by some criteria, it can be replaced with a better hypothesis. PFs can be difficult to implement in practice because it is difficult to mathematically define a "bad" hypothesis. In addition, how does one replace a "bad" hypothesis with a better hypothesis? Another approach is based on the Extended Kalman Filter (EKF). EKFs differ from PFs in that only one single hypothesis is kept at any given time. The benefit is not having to maintain multiple hypotheses at the cost of a critical failure (e.g., an incorrect map feature match) being almost unrecoverable.

Error! Reference source not found. shows the platform. Sensors include a 3D LADAR and three cameras with fisheye lenses (giving 360 degree field of view). The primary mapping sensor is the 3D LADAR, shown in Error! Reference source not found. The base LADAR is a single-line scanner, but is mounted in such a way as to create distinct lines of pixels (two vertical and one horizontal). The result is a "best of both worlds" sensor that gives robust wall detection from the horizontal pixels, while still allowing for support surface characterization from the vertical pixels.

Figure 7:
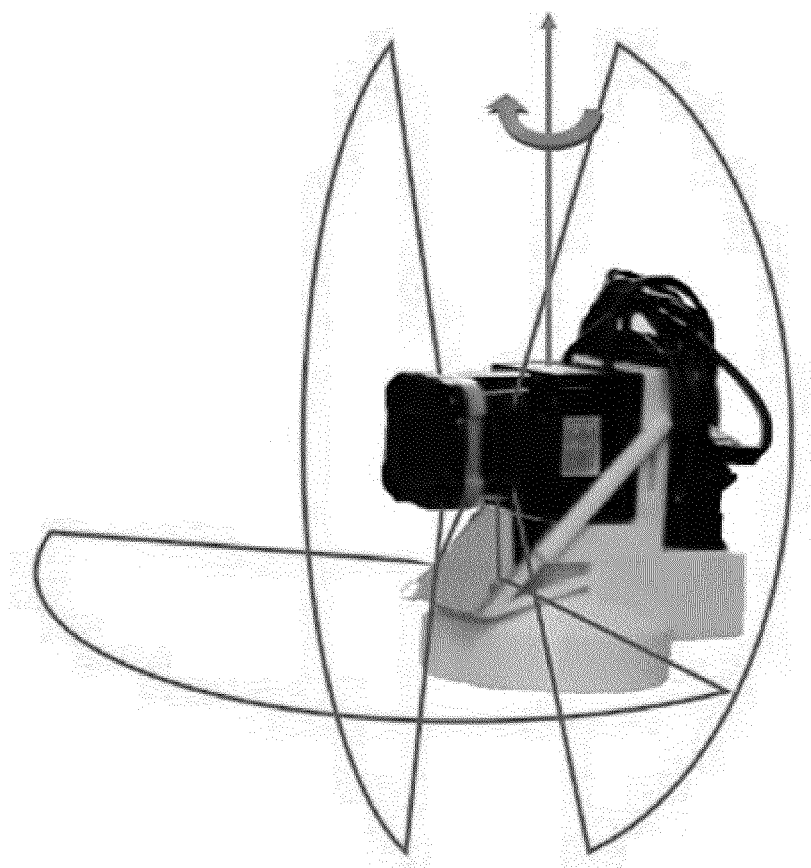
FIG. 7 illustrates the spinning, 3D LADAR sensor.

FIG. 7 shows the spinning, 3D LADAR sensor. The red bars show the sensor's pixels (two vertical sections to the sides and one horizontal section, which bounces off the mirror in front). The green arrow represents the axis of rotation to create the 3D scan.

The proposed SLAM functionality plugs into the coordination mission modality. Throughout a coordination mission, robots are sharing maps in real time to avoid exploring the same area multiple times. However, this is no registration, meaning that as position solutions between the robots drift, the maps no longer align. Because of these navigation errors, not only does the map become incorrect, but the same areas can be explored multiple times if wrong areas are flagged as "explored" or "unexplored."

A low risk map feature that is easy to send using radio systems is now taught. The map feature is one of many possible map features, and is used for illustrative purposes to show how a map feature might be computed and used. The proposed effort can work with any such map features, but some will be better than others (e.g., more reliable or less bandwidth).

This map feature assumes that a LADAR sensor is chosen as the exteroceptive sensor. If a stereo or structured light sensor is chosen, it is unlikely that this map feature would be useful. For ground robotics, LADAR is typically used to take horizontal "slices" of the world. In other words, the scanning plane is parallel to the ground surface. When combined, these measurements can create blueprint-like maps. Suppose that a couple seconds of LADAR data is combined into a "local slice." In these seconds, the robot's navigation solution drifts very little, so it can be assumed near-perfect. A local slice might look like FIG. 8.

Figure 8:
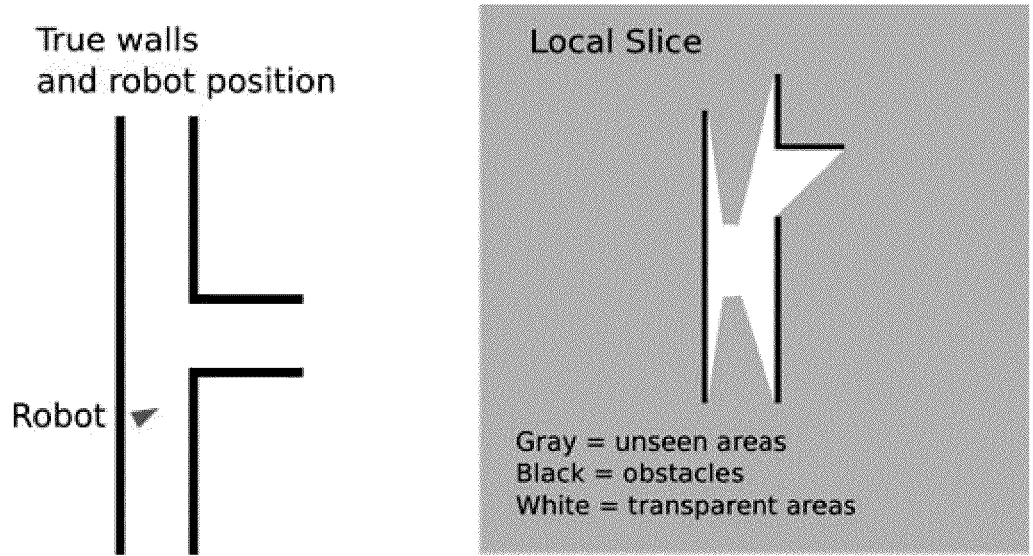
FIG. 8 illustrates Ground truth (left) and how a "local slice" might look (right). Ground truth shows the true location of walls and the robot. In this configuration, the LADAR takes a horizontal "slice" of the world, which is shown as the "local slice." The majority of the area is "unseen," or gray. For gray areas, no knowledge is available because the areas could not be sensed (due to lack of line of sight or sensor range limits). Black lines represent the sensed walls. White regions are "transparent." In other words, we know there is no object in this region. Therefore, the robot can physically travel within this region without hitting an obstacle.

In FIG. 8, the robot is presently in a corridor, but is close to a T intersection. What if there were a map feature, and a way to easily detect it, for intersections such as this? Intersections are ideal because they provide corners with which to perform registration, are relatively infrequent, and are frequently traveled by robots when exploring the world. Even in the previously-described coordination missions, robots will frequently explore the same intersections multiple times. These intersections provide a natural, simple feature with which to use as a map feature.

Figure 9:
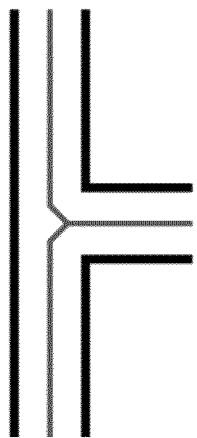
FIG. 9 is a Voronoi diagram for the example.

What is an automated way to detect and match intersections? The proposed effort is based on the work by Beeson, et al. Beeson calls these intersections "gateways." A gateway, by Beeson's definition, is any area where line of sight drastically changes. These could be intersections, a doorway, or any combination of these features. Gateways can be found by examining the "transparent" regions in a local slice, as shown in white in FIG. 8. They are discovered by first creating a Voronoi diagram of the local slice. For FIG. 8, a Voronoi diagram would attempt to trace the middle of the corridor, as shown by FIG. 9. Using this approach, a gateway can be located by finding junctions in the Voronoi diagram. These junctions tend to occur where line of sight changes occur. There are several more criteria to ensure that the local slice is in fact a map feature of interest.

This map feature has several benefits and disadvantages. Benefits include ease of computation, low bandwidth requirements, and simplicity. Disadvantages include poor outdoor performance and that there may be another map feature with lower bandwidth requirements. In order to address disadvantages, significant research on this project is devoted to determining if this map feature is truly minimal. It is likely that there are better map features that may not be derived from this methodology. Of primary importance is finding a feature appropriate for outdoor exploration. For this reason, it is not unreasonable to accept a higher-bandwidth map feature as long as it functions well when outdoors. The outdoor problem is non-trivial for two reasons: LADAR sensor data is much sparser and the LADAR scan pattern can result in a failure to detect obstacles in certain conditions.

Figure 10A:
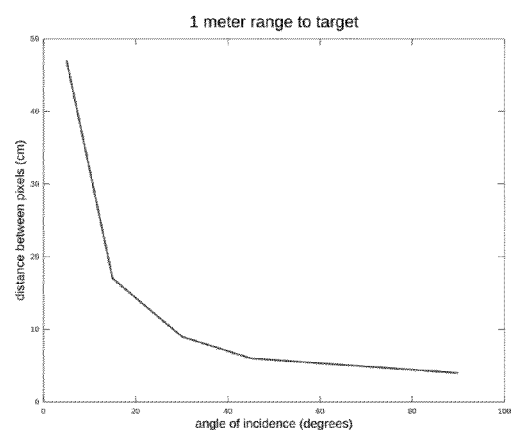
FIGS. 10a and 10b illustrate how the distance between adjacent pixels in a LADAR scan change with respect to the angle of incidence with the object being measured. This is under the assumption that the object being measured is flat.
Figure 10B:
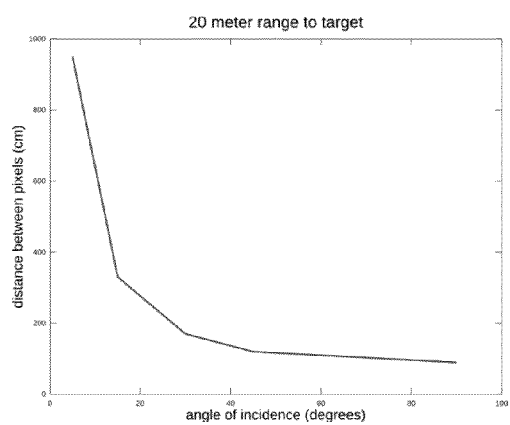

For LADAR sensors, measurements are typically separated by a constant angle. For our present configuration, this angle is 0.25 degrees. For an obstacle 1 meter away, spacing between measurements on the obstacle is at minimum 4 mm; spacing for an obstacle 20 meters away is at minimum 90 mm. This minimum occurs when the angle of incidence of the measuring laser emission and the object's surface is 90 degrees. What happens if this angle of incidence is smaller? FIGS. 10*a* and 10*b* show the results. At 20 meter range, a reasonable range to a nearby object when outdoors, the distances between pixels is frequently more than 200 mm. Due to the sparsity of this data, matching point data is difficult to do correctly.

Another factor that complicates matters is that having LADAR pixels on a target is highly dependent upon the terrain. Consider the single-line scanning LADAR. If the vehicle is on flat terrain and the surrounding area is also flat, then the horizontal pixels of a LADAR sensor will strike far-away objects. What if there is a hill in front of the robot? The LADAR will measure the hill, which may actually be traversable. These measurements are not obstacles and cannot be used with this map feature formulation. There are many such cases in practice where terrain limits the obstacles that can be used for feature matching.

The bandwidth required to share maps and map features is once again, highly dependent on the chosen type of exteroceptive sensor. There are several ways to measure bandwidth. The first is to compute a theoretical bandwidth. The network messages that contain map data or map features is known to the developer. The developer can count the bytes required for each network message, determine how frequently these messages are transmitted, and finally compute the overall bandwidth for this map feature. Another approach is to analyze the network traffic, either with software like Wireshark or with the radio's built in bandwidth monitor (if available). While both techniques are useful, the latter approach tends to be more accurate because it includes network overhead (e.g., TCP/IP or UDP headers) and removes some assumptions made by a developer (e.g., the frequency of a network message).

The appeal of the previously-described gateway map feature is based around one fact: local slices are already shared by robots given our TALON autonomy kit. To flag a particular local slice as a map feature, only one bit is required. Therefore, the added bandwidth to the TALON autonomy package for the gateway-based map feature is a single bit (note: metadata, like robot location, is already transmitted with a local slice). A local slice requires a maximum of 128 kilobits per message, or a bandwidth of about 43 kbps per robot.

Given a "good" map feature, how does one automate map alignment and robot path correction? Of particular importance is how to correct the robot's path when a second visit to the same area is detected. Assume that it's possible to match map features, and that when they are matched, the matching algorithm gives an offset for the robot's positions. For example, suppose we have a set of map features: groups A and B. Sets A and B correspond to the same physical location. When A and B are aligned using the matching algorithm (as shown in FIG. 11), the algorithm will also output something similar to: "When set A was sensed, the robot was 1 meter to the north of the robot when B was sensed." This output is the offset between robot positions.

Given this map feature alignment, the robot's trajectory can be updated. The basis of the position updates is the Levenberg-Marquardt (LM) algorithm. The LM algorithm is a common approach to solve a non-linear system of equations. Under certain conditions, LM performs gradient descent optimization. In this case, the function being minimized is the "energy" of a "spring network." Imagine that each map feature alignment connected a spring between the robot's position at a location, and that the dead-reckoning navigation solution of the robot is a spring. There is an energy equation for one such spring network. When this function is minimized, the positions and orientations of the robots are corrected. This approach works well for single or multiple robots.

The inventors have successfully applied this LM algorithm technique to a very similar, non-robotic case. This case involved human positioning systems. At important intersections, a user manually adds a "map feature" into the LM algorithm. The result is a corrected navigation solution that is far superior to the raw data. Of note is that the LM algorithm performs very well in the presence of non-linearities introduced by heading drift. The same algorithm, with some extensions, should yield superior results for the robot SLAM case.

The information from multiple localization methods will be fused by creating a "spring" network among different updates, using the springs to "pull" the navigation solutions to a more accurate location. The strength of each spring will be determined by the confidence of the update. This type of architecture was originally developed by RR and used on the UMAPS program to fuse the relative localization solution of multiple INS systems strapped to dismounted soldiers. As the soldiers explored the GPS-denied area, their INS navigation solution was sent to an OCU. If the soldiers met at a "rendezvous" location, this was sent to the OCU which then created an infinitely tight spring between their navigation solutions at that time, essentially locking them into the same place. Looser springs existed along each of their relative solutions in order to keep the general shape of the path that they took. Springs also existed to absolute positions, which were either surveyed points that the soldiers tagged (infinitely tight springs) or GPS updates when available (somewhat looser springs). This same framework will be used by TERRANav, but instead of tagging "rendezvous" points to fuse multiple relative solutions, the system will use absolute position "springs" to pull the overall solution toward the updates.

Operational Example

Figure 12:
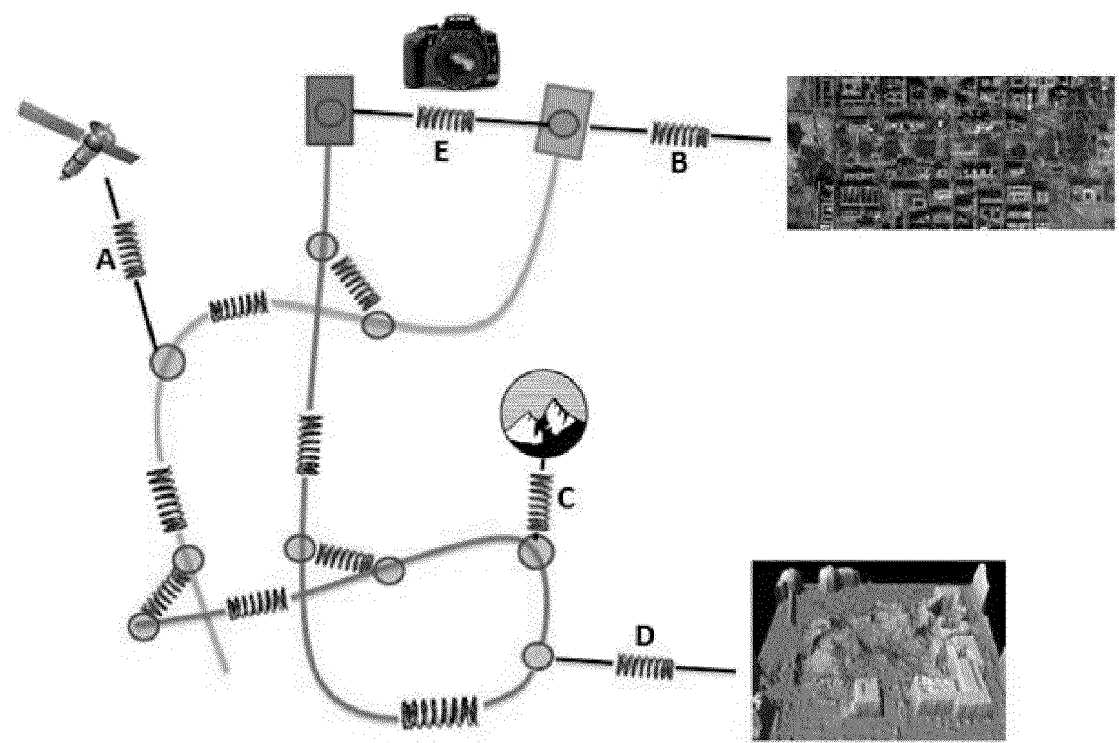
FIG. 12 is a conceptual example of the spring network.

FIG. 12 shows a conceptual example of how the spring network will work. The yellow and blue paths are two separate runs by the AUGV. The AUGV will compute its relative localization solution using its inertial sensors and available odometry. At Spring A in the figure during the first (yellow) run, the AUGV may get a poor GPS update, so it inserts a weak spring into the network, slightly pulling its path toward that solution. At the end of the run, it inserts Spring B by registering some local sensor data to aerial imagery. The registration algorithm reports high confidence, so the spring is strong. Since it has a confident absolute position solution, it geo-tags some local sensor data and stores it for a future run. During the next (blue) run, the AUGV is able to register its position to some DTED data because of a unique change in elevation and inserts Spring C. Nearby, Spring D is inserted by registering the local LIDAR sensor data to some aerial LIDAR in a stored database. At the end of the blue run, it registers some local features from an EO image to data from the previous run and inserts a strong Spring E that pulls it to the same endpoint. These springs allow each absolute localization method to provide a weight or confidence level to affect how much the overall solution gets corrected. Infinitely strong springs perform a sort of "localization reset."

Technical Details of the Spring Network

The concept of springs as discussed above is solved using least squares of the form Ax=b, where A characterizes the springs, b quantifies the strength of the spring, and x are the offsets applied to the navigation solutions. For non-square matrix A, the naïve approach to solve this least squares problem is $x=(A^{\tau}A)^{-1}A^{\tau}b$, which is called the normal equation. However, this approach is computationally expensive and numerically unstable (for some choices of A) because of the required matrix inversion.

In practice, least squares problems are solved with an algorithm such as QR factorization. In its simplest form, QR factorization is a transformation on the matrix A such that A=QR, where Q is orthonormal (i.e., $Q^{\tau}Q=I$) and R is upper triangular. Substituting this factorization into the normal equation above, we find:

$$z=(A^{\tau}A)^{-1}A^{\tau}b=((qR)^{\tau}QR)^{-1}(QR)^{\tau}b= (R^{\tau}Q^{\tau}QR)^{-1}R^{\tau}Q^{\tau}b=(R^{\tau}R)^{-1}R^{\tau}Q^{\tau}b=R^{-1}Q^{\tau}b$$

The normal equation simplifies to $Rx=Q^{\tau}b$, which can be efficiently solved with a single matrix multiply and a linear equation solver.

Now that the use of QR factorization has been justified, there is now a question of how to efficiently solve the QR factorization of a matrix, preferably in a distributed form. One method to solve a QR factorization is called Householder QR. In Golub and Loan, the Householder QR algorithm is defined for a general matrix. Without copying the algorithm here, one key feature to note is that a Householder transformation on row j affects only rows in A with below diagonal, non-zero entries in that column. This fact is the key to solving the distributed QR factorization for this problem.

Figure 13:
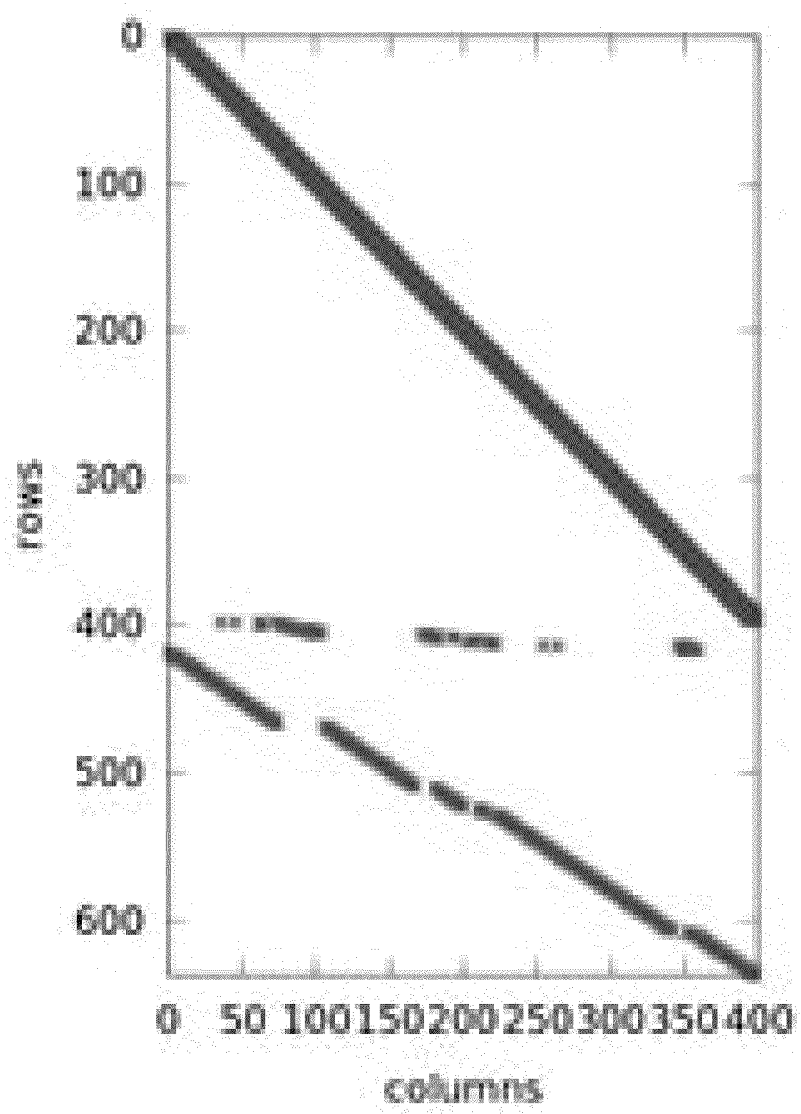
FIG. 13 shows a visualization of a real matrix used to solve a spring problem. Blue regions are non-zero, while white regions are zeros.

The matrix A for which we are solving is block lower triangular, as shown in FIG. 13. Since many of the entries below the diagonal are already zero, much of the Householder transformations can be simplified and broken into separate problems. Lu and Barlow define the algorithm to do this factorization. The basis of this work is on analyzing the structure of the matrix A and how to divide it up into subproblems. This analysis is performed with column intersection graphs, which link two columns that have at least one non-zero entry in both rows. Column intersection graphs are then transformed into elimination trees, identifying subproblems that can be computed by different processing units. For brevity, the entirety of Lu and Barlow's work is not presented here.

The least squares solver is of computational complexity $2\pi^2(m-n/3)$, where m is the number of springs and n is the number of positions. This fact is significant because it shows that there exists such a number of springs and positions that the problem is no longer solvable in real time. When we consider the possibility of processing this through distributed computing, we also must keep in mind the bandwidth constraints of the network. There must be a way to simplify the manner with which the springs are represented within the problem. Without this simplification, we are left with an intractable solution.

Figure 17:
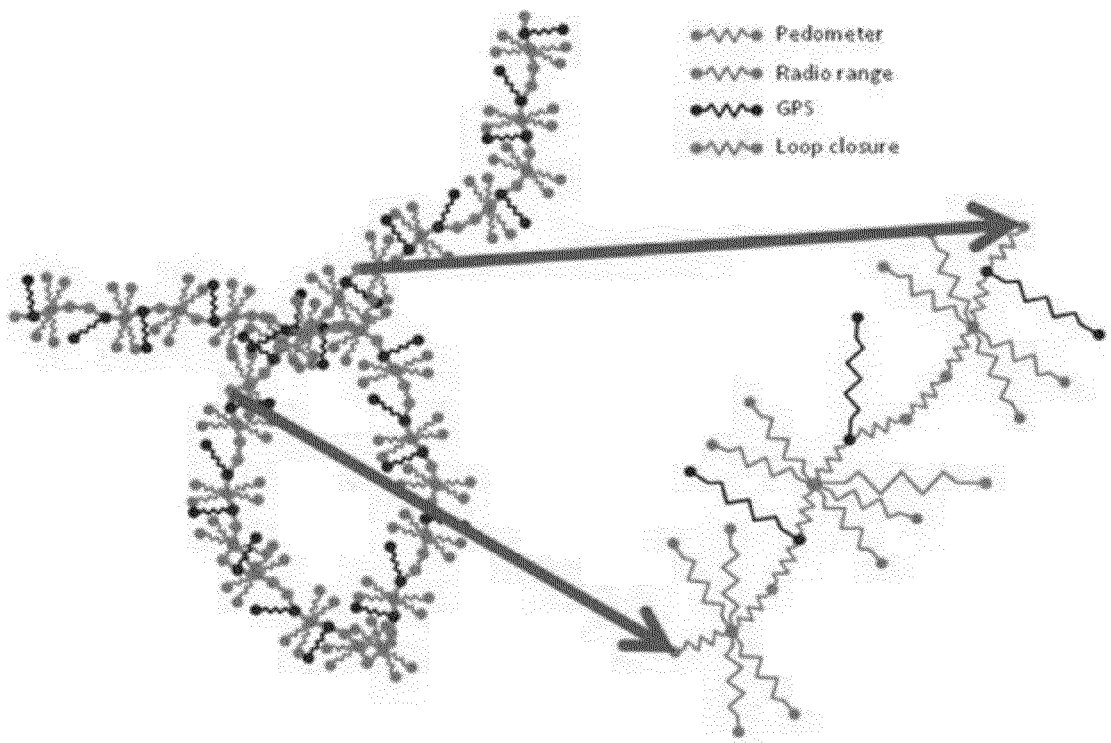
FIG. 17 illustrates a series of springs of and between positioning units. Springs include a pedometer, radio ranging, GPS, and links between pedometer points (called loop closures).
Figure 18:
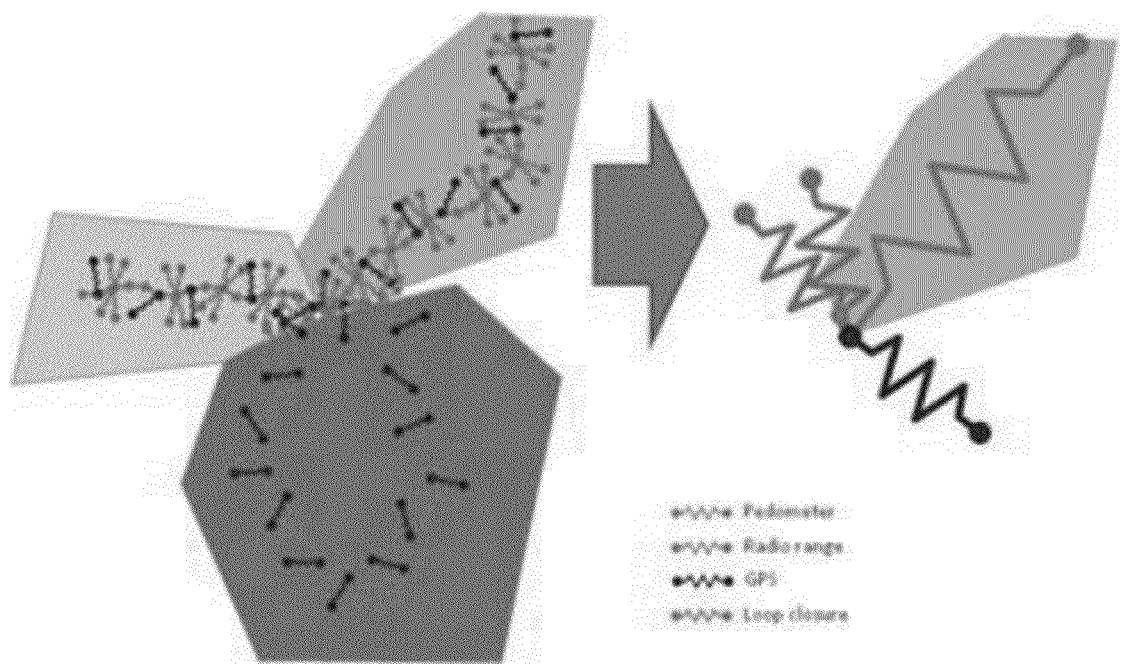
FIG. 18 illustrates a spring simplification. Springs in the purple region are collapsed into one, large spring for each spring type. Pedometer data is one large spring, radio ranging between each radio is one large spring, and GPS is one large spring. This compression of data significantly simplifies information to be shared via radio.

The present invention simplifies a large number of nearby springs into a small set of springs that represent almost the same information. Because we are compressing the springs, there will, of course, be loss of information, but we believe this loss will be minimal in the overall scope of the problem. Moreover, the compression of this data will enable quick and reliable transmission of data to other positioning units. The compression's basis is around a force analysis of the spring system. The algorithm breaks the spring system, as shown in FIG. 17, into regions of springs that have a significant effect on surrounding springs. This effect can be quantified by analyzing how new forces on a spring changes forces on a nearby spring. Using these results, large groups of springs will be merged into "mega" springs, as shown in FIG. 18, that are easily shareable throughout the network of positioning devices. Moreover, because a small set of springs are used, the problem is simple enough to always be solvable given a minimal set of computational resources.

Some implementations are better suited for centralized post-processing while others are typically suited for real-time determination of the current position. For instance, the Kalman Filter is a very efficient method for estimating the current position due to its recursive nature.

However, if the best estimate of position at all times need to be estimated the typical methodology is to either augment the state vector (resulting in very large matrices that must be maintained over time) or propagating new information back in time using Kalman Smoothing (resulting in very large update times). Conversely, conventional least-squares incorporates all the springs in a single-step (thus allowing efficient post-processing), but yields very large update times when new measurements must be incorporated on-the-fly in the real-time setting. In addition, depending on the errors associated with the underlying sensor, either a linear or non-linear estimation methodology may be used.

In the case of the pedometer, non-linearity creeps into the system model due to errors in rotation. However, the attitude error rate of the pedometer is slow enough where typical linearization methodologies such as the Extended Kalman Filter and Levmar-Marquardt work very well. The current implementation utilizes this least-squares methodology, which is able to increase the speed of the computation by exploiting the fact that the least squares matrix is sparse, therefore allowing the use of sparse matrix computation libraries. QR Factorization is used to obtain a numerically stable, less error prone least-squares solution than alternative methods such as Cholesky factorization.

The inventors will investigate new methods for solving the spring network. One method they propose is a decentralized cascaded filtering framework. This approach will allow individuals to use the local information they have to obtain an excellent estimate of their position (and the position of nearby users) without requiring much computing or communications requirements. As communication is available (or additional "springs" are added), the individual local filters combine their information into a single global estimate. In addition, a feedback signal is provided to the local filters to improve their local estimate of the soldiers' positions.

Figure 19:
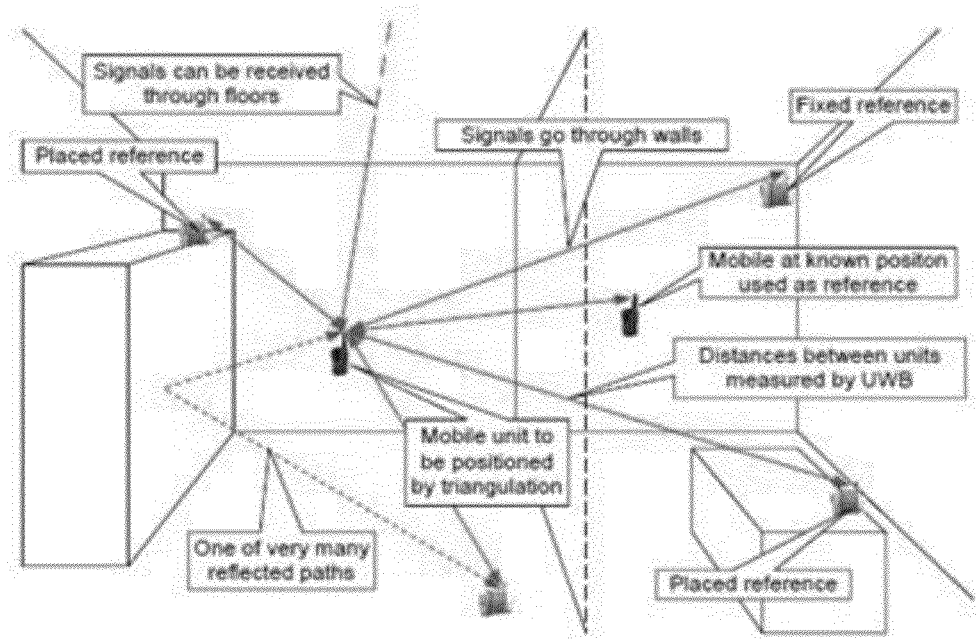
FIG. 19 illustrates radio ranging and multipath visualization.

Now referring to FIG. 19, radio ranging is a method of determining distances between radio units by timing when the radio signals are transmitted and received. In terms of this system, knowing the distance between different users will create new springs, possibly replacing the manual process of adding sync-ups. Radio ranging can also be used to add and subtract users from the network as they maneuver in the environment. Radio ranging offers the additional benefit of being able to operate indoors unlike GPS systems which become inoperable indoors. Given several units with known locations a mobile unit can be located by triangulation. Due to reflections and scattering effects (multipath), signals can arrive by multiple paths rather than a single direct path. Radio ranging would allow for the unique opportunity to have an additional navigation solution that would be operable both inside buildings and outdoors in locations that are GPS-denied.

Relative Localization

An accurate relative localization solution can greatly enhance the performance of any absolute localization method for several reasons. First, it can reduce the search space of the method when trying to register local sensors against a priori databases. Second, many of the matching algorithms use a gradient descent method, which will converge to a correct local minimum faster if seeded with a better starting point. Finally, it can be used to filter out erroneous absolute estimates. If the relative localization solution thinks the AUGV has only traveled 20 meters from its last absolute position update, but an absolute localization method reports an update a mile away, the update is likely to be an error.

Military Embodiment

The present invention, in a military embodiment, is an accurate, distributed navigation system for determining the location of soldiers as they carry out a mission, even in GPS-denied areas. The present invention, sets up virtual "springs" between one soldier's navigation solution and other soldiers' navigation solutions, GPS data, radio ranging information, and/or known or predetermined landmarks.

During a mission, knowing a soldier's location is fundamental information required for crucial functions such as navigation, maneuverability, and coordination with other warfighters. Using GPS, the position of a soldier is relatively easy to determine without complex computations or communications. Unfortunately, dismounted soldiers frequently need to localize their position in GPS-denied environments such as mountainous terrain, valleys, caves, or urban canyons. The present invention, integrates a combination of sources to determine the most accurate location of the entire team. The present invention combines accurate human positioning in GPS-denied environments with OCU software that performs real-time track alignment.

Dismounted soldiers operate in small teams to carry out a mission. A needed tool is a communication network between the soldiers that uses the collaborative data of multiple team members to determine a more precise estimate of the soldiers' current positions, as well as their previous positions. By having open data communication lines between each of the INS devices, there are a number of ways that the devices can coordinate together to provide useful information regarding accurate localization, despite being in an environment that is hidden from GPS satellites. Since the team will most likely be out of range of a centralized command computer, we can utilize each of the individuals' processor units to perform tasks that may require large amounts of data processing such as navigation or path correcting.

The present invention can be embodied as a foot-mounted pedometer unit, based on INS technology, which can communicate wirelessly with Android devices through Bluetooth to relay IMU data. In turn, this Android device performs a processing analysis (i.e., Kalman filtering) to correct for the error in position caused by integrating noisy sensors. The inventors recently conducted initial work on a "spring" correction navigation algorithm for correcting the pedometer solution. The "springs" and navigation data are currently transmitted to a central Operator Control Unit (OCU) which performs and sends out the navigation correction, but these corrections are being transitioned to be run in a more distributed architecture. This work is the basis for the present invention, and this prior experience provides us with the unique ability to rapidly prototype and test the distributed navigation system using our existing pedometer platform.

The position estimate calculated from the pedometer alone still has an error of ~1% of the distance traveled. There are a number of simple solutions to minimize this error even further. Along a dismounted soldier's path he may come across an opportunity to sync up his position with a number of extraneous objects or people. With these proposed sync ups, we can gain information that can not only minimize the error in the current position but also minimize the error in the calculated path that has been taken.

To conceptualize the effect of the sync ups, an analogy can be equated to putting a "spring" in between the chosen "sync-up" point and our own position so that it will "pull" our entire position history to lean toward that point. Additionally, there are "springs" between all the pedometer-calculated points so that we maintain roughly the same shape while being pulled by this new "spring". The strength of the spring is determined by the accuracy of the extra information that we receive. For example, if the user walks by a surveyed point with a known absolute location, the algorithm would put the equivalent of an infinitely stiff spring to that location, meaning that that navigation point is locked to that location. If the user gets a GPS location with poor accuracy, a weak spring will be inserted so that more accurate data obtained in the future will be able to pull that point to a more accurate location.

Figure 14:
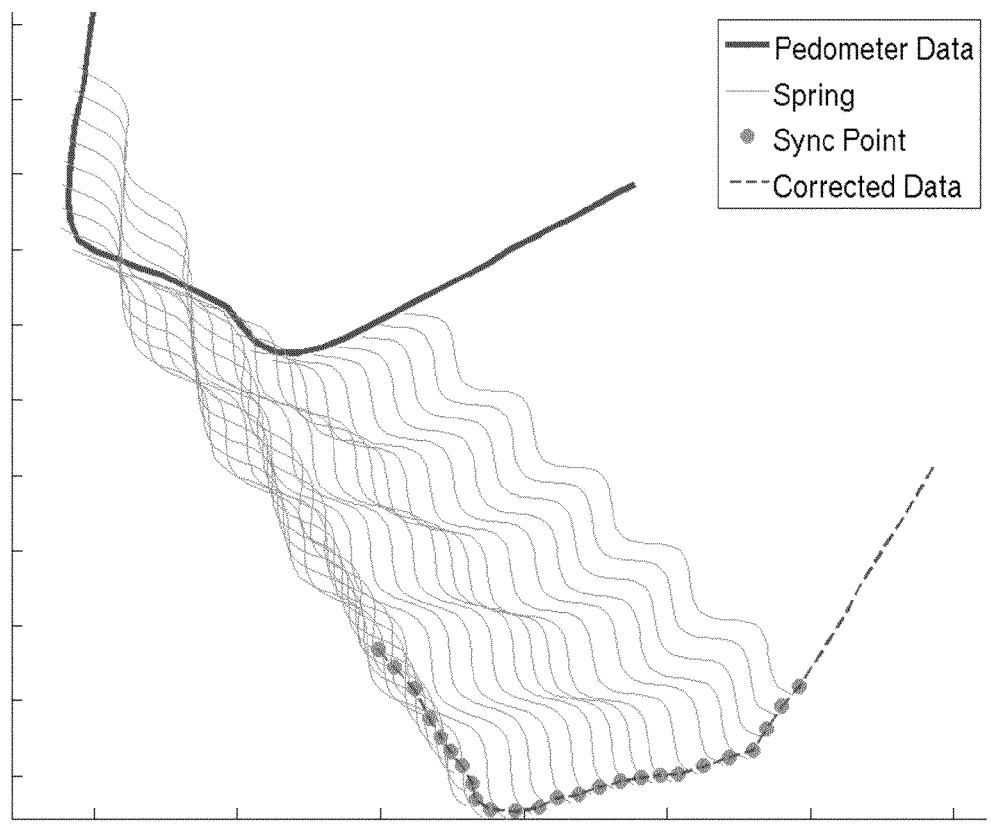
FIG. 14 illustrates pedometer data being corrected by rendezvous sync points, where the springs are infinitely stiff.

A team leader can designate a "rendezvous point" for his team and other teams to sync up with. This point will be a physical location on the ground that the soldiers can use to stamp and sync their boot. There are two kinds of rendezvous points, fixed and floating. Fixed points are locations where the absolute ground truth is known beforehand. These points will generate an infinitely stiff "spring". An example of pedometer data corrected by a series of fixed rendezvous points is shown in FIG. 14.

Sections of pedometer are rotated, translated and scaled to match each rendezvous sync points exactly. We treat these rendezvous sync points as perfect location data because the location of the rendezvous points will be known.

Floating rendezvous points are used to designate locations where multiple soldiers have passed through, but the absolute location is not known. These floating rendezvous points create springs between the soldiers that have passed through the location and the rendezvous point, allowing each soldier's navigation information to contribute to the individual's solution.

The ultimate method of tagging this location is yet to be determined, but one method would be for the leader to mark the location with a spray painted symbol. Other teams that come across this symbol can also sync their location with the symbol. The rendezvous point and its symbol can be transmitted back to a central command unit (CCU), so that whenever the team is in communication range of the CCU they can upload or download new rendezvous symbols and their locations. The application of this method for robotic vehicles is intriguing.

When a new solider enters the team, or if someone's position becomes corrupted then a proximity sync will help clear up any errors. Two soldiers can stamp boot-to-boot and sync up their position with each other. This "spring" is also infinitely stiff, but it's not anchored to a global ground position. Instead it "pulls" the trajectories of the two soldiers together with equal weight. Robots could "bump" their way to a better solution.

Figure 15:
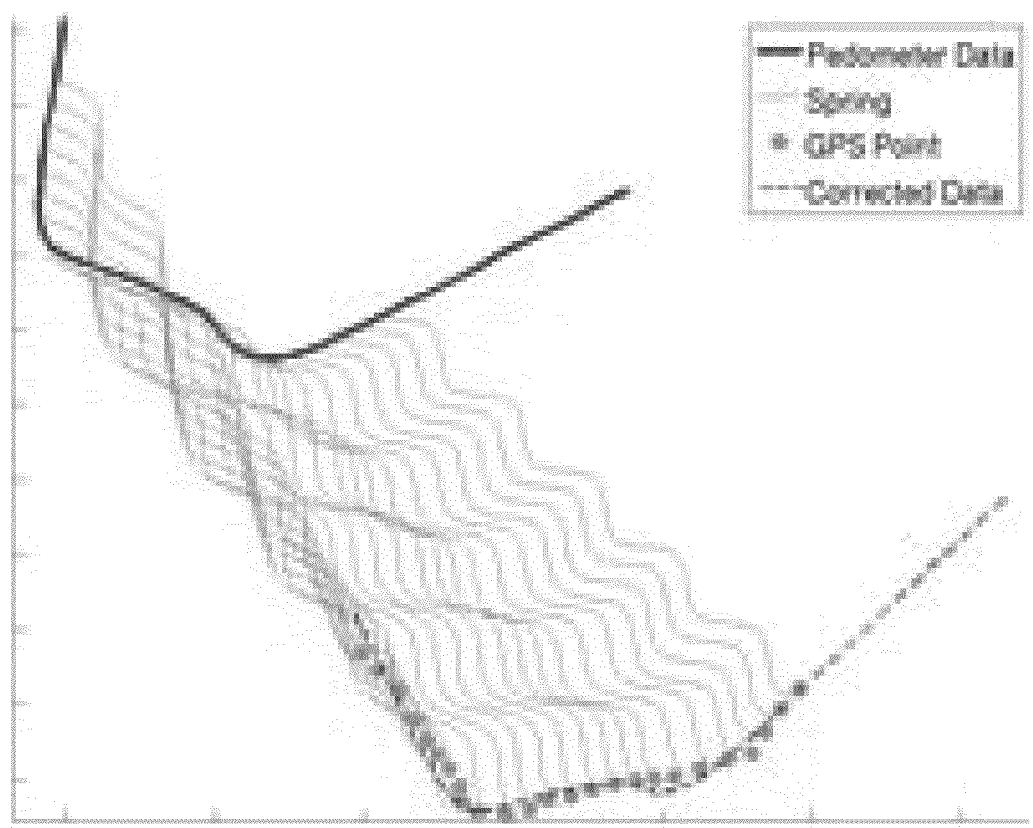
FIG. 15 illustrates pedometer data being corrected by GPS data.

A GPS module will be integrated into the system, either using the GPS capabilities of the Android device or an external GPS module. In the case that the wearer gets a brief signal from GPS satellites, we can automatically sync to that global location while weighting the bias of the sync according to how strong of a signal we get. An example of pedometer data corrected by a series of GPS points is shown in FIG. 15. Here you can see that, since the GPS accuracy is not perfect, the springs are weaker and the pedometer trajectory is able to roughly maintain its same shape.

For the military embodiment, the inventors have performed a test using this "spring" correction algorithm, the pedometer, and the Android phone GPS. In this test, a single person walked a loop five times; large portions of the loop had no GPS available. When the user came to a point where quality GPS was available, a "spring" was created between that GPS position and the pedometer's estimate of the position. The stiffness of the spring was determined by the accuracy of the GPS signal. The loop that was traveled was composed of a number of fixed rendezvous points, whose absolute physical position was previously surveyed. Whenever the test subject arrived at such a point, they placed their foot on that specified location and pressed a button on the Android device to signify that they had reached a rendezvous point. The points are shown in large green circles. Since the true positions of the points are known, we created rendezvous point "springs" which are infinitely stiff and connect to the known positions of each point.

Figure 16A:
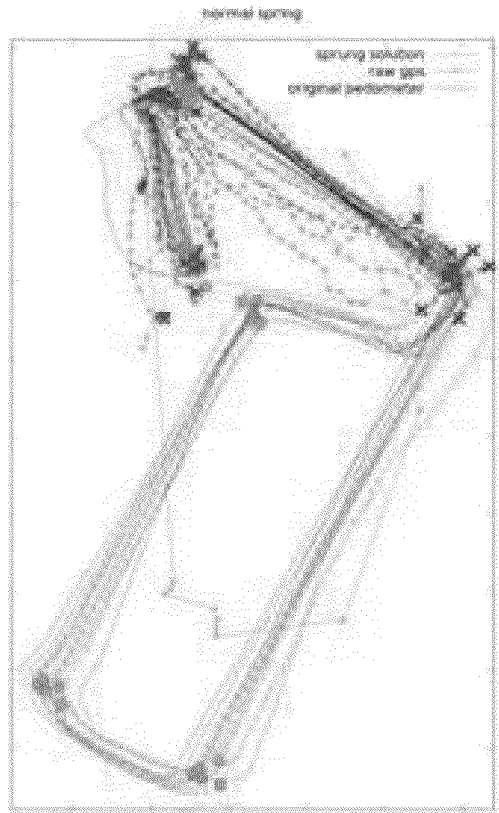
FIG. 16a illustrates the present invention using only GPS "springs".
Figure 16B:
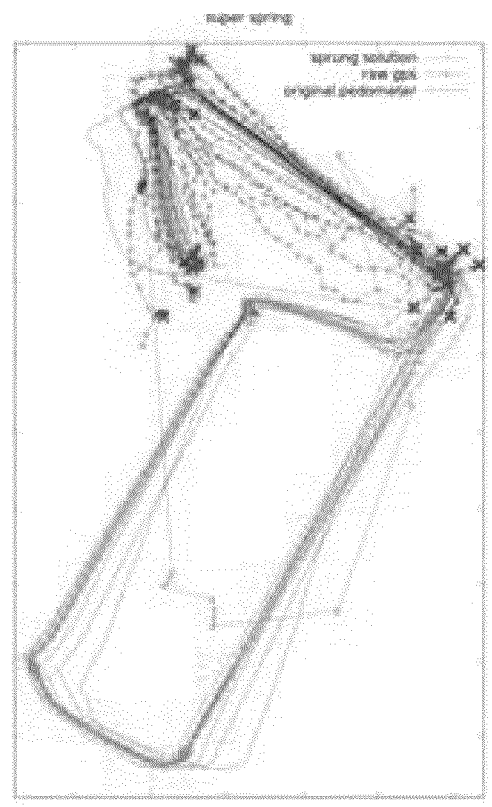
FIG. 16b illustrates the present invention using GPS "springs" and rendezvous point "springs".

FIG. 16a shows the data using just these GPS "springs" (shown in large red x's). As the graph shows, the "spring" correction reduced the heading drift of the system, though the errors are still prevalent. In the next step, members used a proprietary technique to synchronize their solutions at globally-known points. Rendezvous points were created as "springs" which are infinitely stiff and connect to the known positions of each point. FIG. 16b shows the data with these stronger "springs". The heading drift is significantly reduced by adding these "springs."

The mapping and positioning system is currently capable of maintaining localization in GPS-denied areas with accuracies better than 1% of distance traveled without calibrating for a particular person. This capability is achieved by performing zero velocity updates at each foot-fall, in turn eliminating the accelerometer errors. Through a system of clever synchronizations between multiple localization units and group filtering, the system is capable of maintaining very accurate relative position between separate units. The goals for the present invention are to test the concept architecture for the distributive network between the soldiers and to demonstrate the effectiveness of our corrective "spring" algorithm for localization. The inventors will also conduct broad-scale tests using our UMAPS pedometer system to determine the most effective way to communicate and collaborate in the network.

The inventors will also test the user interface on the Android device which allows the soldiers to input additional information which could improve the position estimate of the IMU data. Specifically, the users would use certain notification buttons on the Android app which signify certain situations. Soldiers coming into close contact with one other, after traveling independently, can "sync" their positions together, effectively correcting the complete group's positioning network in real-time. Soldiers can sync their position with an already established "rendezvous point" location. Other events can automatically trigger notifications within the system to improve the localization estimate. For example, if a user acquires GPS, that location data can be altered so that his path biases towards the GPS data, taking into account the accuracy of the GPS signal. Additionally, the system will automatically add a soldier to the network when he comes into range, and remove a soldier when he goes out of range.

The present invention utilizes multiple sensing and communication devices worn by the soldier to determine positioning information. The key components consist of an Inertial Navigation System (INS), a mobile computing device, such as an Android phone, and a radio for obtaining range data. The raw INS and radio ranging data will be sent to the mobile device, which will compute the positioning estimate using a number of techniques to eliminate integral drift. The mobile devices will communicate over a wireless Local Area Network, sharing positioning information which will be used to correct an individual's position estimate. This information from multiple team members will be fused by creating a "spring" network among different soldiers, using the springs to "pull" the navigation solutions to a more accurate location. One of the main errors seen with pure INS navigation solutions is heading drift. Also known as the "peacock" problem, the effects may be seen when two people walk in a straight line next to each other, yet heading drift shows the positions fanning out like a peacocks tail. Adding a spring between the two positions can pull the navigation path back to a straight line. The spring network system will be solved by the distributed mobile devices.

In an alternative embodiment, the method of the present invention is provided for orienting a pedestrian and a human where the relative heading and position of vehicle and human are aligned by the person tapping on two or more wheels or other part of the vehicle.

For example, in this human/vehicle application, one or more firefighters wearing a pedometer taught by the present invention get off a fire truck. The fire truck has a navigation unit that provides heading and position. At least one firefighter touches or taps the front and back wheel of the fire truck. At that point the firefighter system, that is aware of the location of the wheels of the fire truck with respect to its navigation system, computes the position and heading of the individual firefighters given the fact that at least one of the firefighters touch or tapped the front and back wheel of the fire truck.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A program storage device readable by a computer machine, tangibly embodying program instructions executable by the computer machine to perform method steps for a method for urban mapping and positioning, said method steps comprising:
   producing real-time, 3D mapping and localization for a user as the user moves throughout a GPS-denied environment;
   an Operator Control Unit (OCU) displays information collected 2D floorplans; 3D textured-enriched surfaces of a structure's interior; and the location of the users within that structure;
   providing an open architecture that allows the program storage device to function with any OCU;
   combining one or more subsystems, wherein the one or more subsystems comprise three distinct subsystems: obstacle maps for robot mobility, mapping, and positioning;
   creating a "spring" network among different updates by fusing information from multiple localization methods;
   determining a strength of each spring by a confidence value in the update;
   using the springs to "pull" one or more navigation solutions to a more accurate location based on the confidence value of the update.

2. The method of claim 1 further comprising the step of producing UMAPS-Positioning (UMAPS-P), which provides GPS-denied position estimation for human users.

3. The method of claim 1 further comprising the step of providing a human-worn mapping component of UMAPS that can provide increased situational awareness for command and control, identify unexplored regions of a building, and provide advanced intelligence for warfighters.

4. A The method of claim 1 further comprising the step of generating maps from a robotic platform, providing critical 3-D survey information of remote, enclosed or dangerous spaces without compromising human presence or safety.

5. The method of claim 1 further comprising the step of allowing the determination of one or more canine unit positioning relative to a mission objective.

6. The method of claim 1 adapted for mounting on a backpack and a robotic platform.

7. The method of claim 1 further comprising the steps of:
   fusing one or more relative localization solutions of multiple INS systems strapped to dismounted soldiers;
   as the soldiers explored the GPS-denied area, each soldiers individual INS navigation solution is sent to an OCU;
   if the soldiers met at a "rendezvous" location, this navigation solution is sent to the OCU which then creates an infinitely tight spring between each soldiers individual INS navigation solutions at that time it occurs, locking them into the same place;
   one or more looser springs exist along each soldiers individual relative solutions in order to keep the general shape of the path that each individual solider took; and
   one or more springs also existed which correlate to absolute positions, which were either surveyed points that the soldiers tagged as infinitely tight springs or GPS updates when available.

8. The method of claim 7 further providing the step of:
   using absolute position "springs" to pull the overall solution toward the updates.

9. The method of claim 1, wherein the program storage device readable by a computer machine, tangibly embodying program instructions executable by the computer machine to perform method steps is robot-mounted, human-worn, or canine carried.

* * * * *